(12) United States Patent
Beck et al.

(10) Patent No.: US 6,745,634 B2
(45) Date of Patent: Jun. 8, 2004

(54) PRESSURE CONTROL DEVICE

(75) Inventors: Erhard Beck, Weilburg (DE); Peter Volz, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 138 days.

(21) Appl. No.: 10/203,919

(22) PCT Filed: Feb. 5, 2001

(86) PCT No.: PCT/EP01/01182
§ 371 (c)(1),
(2), (4) Date: Aug. 15, 2002

(87) PCT Pub. No.: WO01/60669
PCT Pub. Date: Aug. 23, 2001

(65) Prior Publication Data
US 2003/0010390 A1 Jan. 16, 2003

(30) Foreign Application Priority Data

| Feb. 18, 2000 | (DE) | 100 07 350 |
| Feb. 18, 2000 | (DE) | 100 07 351 |
| Feb. 18, 2000 | (DE) | 100 07 353 |
| Jun. 20, 2000 | (DE) | 100 30 250 |

(51) Int. Cl.$^7$ .................................................. G01L 7/00
(52) U.S. Cl. ................................... 73/756; 303/119.3
(58) Field of Search ........................ 137/884; 73/756; 303/119.2, 119.3, DIG. 3, DIG. 4

(56) References Cited

U.S. PATENT DOCUMENTS

| 5,866,822 A | 2/1999 | Willig |
| 5,925,826 A | 7/1999 | Kodama et al. |
| 6,220,101 B1 * | 4/2001 | Schloss et al. ................. 73/756 |
| 6,312,061 B1 * | 11/2001 | Schliebe et al. ............... 303/20 |
| 6,375,473 B1 * | 4/2002 | Schliebe ........................ 439/66 |
| 6,443,536 B1 * | 9/2002 | Tracht et al. .............. 303/119.3 |

FOREIGN PATENT DOCUMENTS

| DE | 195 14 383 | 10/1996 |
| DE | 197 11 366 | 9/1998 |
| DE | 197 55 821 | 6/1999 |
| DE | 198 49 287 | 1/2000 |
| WO | 00 02755 | 1/2000 |

* cited by examiner

Primary Examiner—John Fox
(74) Attorney, Agent, or Firm—Rader, Fishman & Grauer PLLC

(57) ABSTRACT

The present invention relates to a pressure control device, in particular for motor vehicle braking systems, with at least one valve carrier accommodating a pressure control valve, a pressure sensor for detecting the hydraulic pressure in a pressure fluid channel of the valve carrier as well as with an electric module including electric and/or electronic structural members and being connected to the pressure control valve and the pressure sensor by way of electric contacts. The pressure sensor is positioned in a space interposed between the pressure control valve and the electric module, with at least one of the contacts that is connected to the pressure sensor leading through a sensor carrier to the electric module. The sensor carrier is located at least in sections within the space.

11 Claims, 5 Drawing Sheets

PRESSURE CONTROL DEVICE

TECHNICAL FIELD

The present invention generally relates to pressure control devices and more particularly relates to hydraulic valve assemblies.

BACKGROUND OF THE INVENTION

A pressure control device of the above-mentioned type of construction is disclosed in P 195 14 383 A1. This pressure control device includes in a valve block, in parallel to several valve rows, a pair of pressure sensors that are attached directly in the valve block and have an electrical contact by way of a cover mounted on the valve block. This fact automatically necessitates a valve block that is adapted to the requirements of the pressure sensors with respect to its dimensions and the arrangement of bores.

In view of the above, an object of the present invention is to avoid the mentioned shortcomings in a pressure control device of the said type so that the arrangement of pressure sensors affects the design and manufacture of the valve block to the least possible degree.

DETAILED DESCRIPTION OF THE PREFERRED EMBODIMENTS

Figure 1:
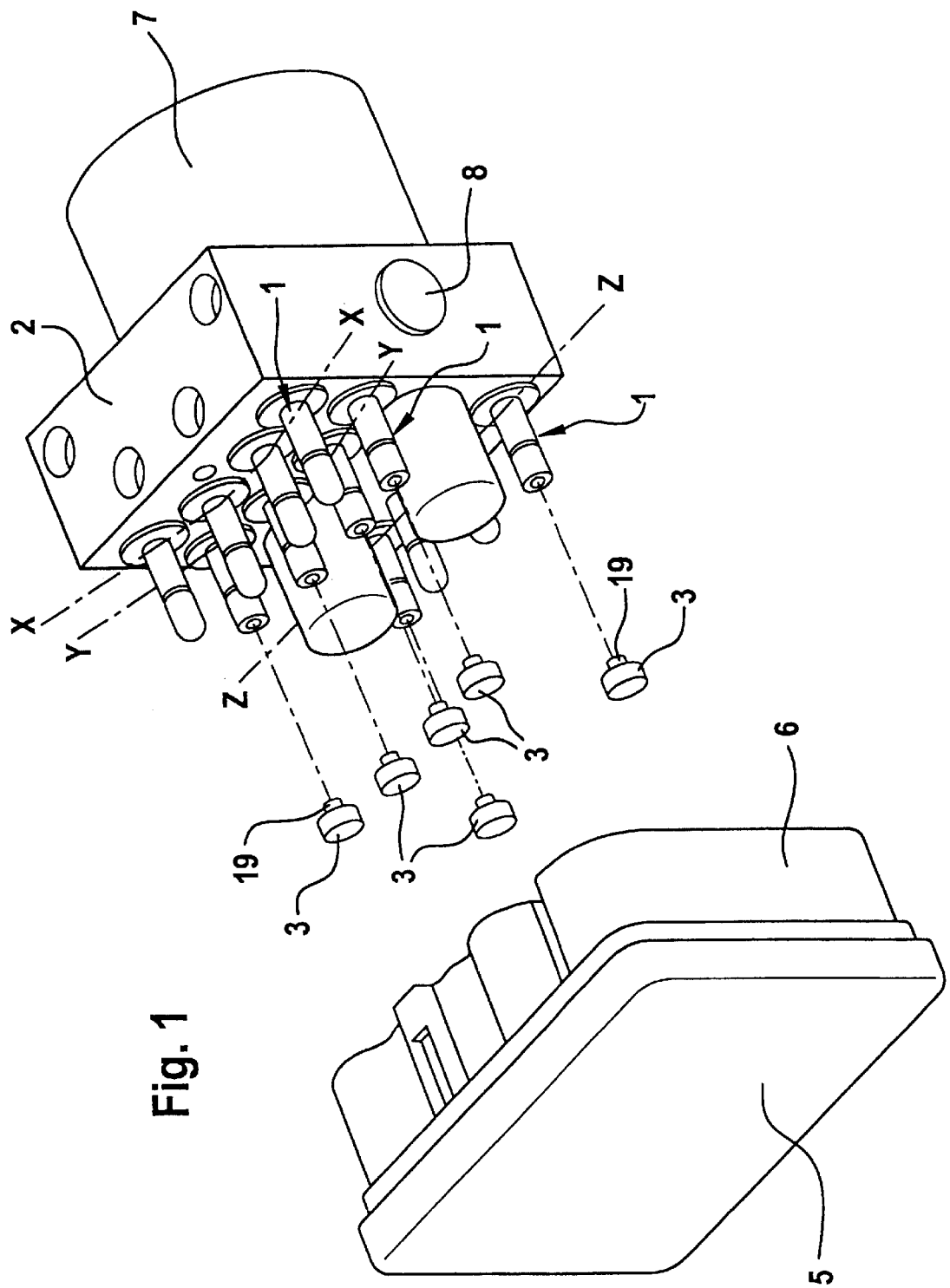
FIG. 1 is an exploded view of pressure control device of the present invention.

FIG. 1 shows the pressure control device of the present invention including a valve carrier 2 accommodating several pressure control valves 1, a plurality of pressure sensors 3 associated with the pressure control valves 1 for detecting the hydraulic pressure in the pressure fluid channels 4 which latter extend until the end portions of the pressure control valves 1 that project from the valve carrier 2, and an electric module 5 including electric and/or electronic structural members and being connected to the pressure control valves 1 and the pressure sensors 3 by way of several electric contacts 18. In the present embodiment, the pressure sensors 3 are fitted to the pressure control valves 1 normally closed in their basic position. Upon request or requirement, however, such an arrangement of pressure sensors 3 is also possible on the pressure control valves 1 that are open in their basic position. The members of the pressure control valves 1 that project from the block-shaped valve carrier 2 in the three parallel valve rows X, Y, Z form a magnetic drive for the electromagnetic actuation of the valve hydraulics in the valve carrier 2 along with the valve coils arranged in the frame-shaped covers 6 of the electric module 5, after the cover 6 is mounted onto the valve carrier 2. The pressure sensors 3, configured as disc-shaped pressure sensor modules, are arranged in a space 17 separating the electric module 5 from the pressure control valves 1. Additionally, it can be gathered from FIG. 1 that, on the end face of the valve carrier 2 remote from the cover 6, an electric motor 7 for driving a hydraulic pump 8 is arranged which is likewise integrated in the valve carrier 2. The electric motor 7 is connected to the electric module 5 arranged in the cover 6 by way of an electric plug that is passed through the valve carrier 2 so that the electric contact making is not limited to the pressure sensors 3 and the pressure control valves 1.

Further details of the pressure control device shall be explained in the following by way of FIG. 2.

Figure 2:
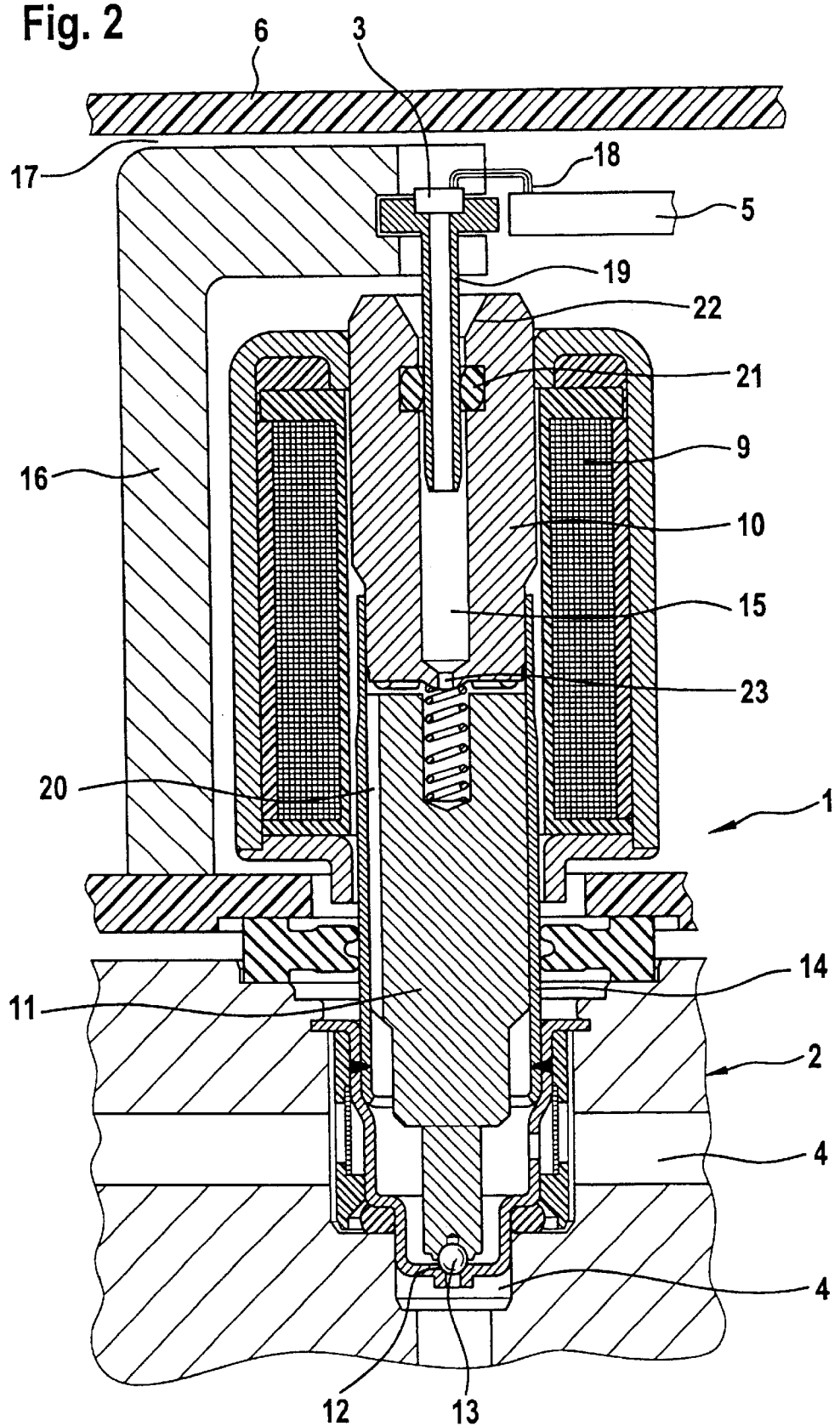
FIG. 2 is an enlarged cross-sectional view of a constructive embodiment of the pressure control device in the area of an electromagnetic valve illustrated in FIG. 1.

FIG. 2 shows an enlarged cross-section of the pressure control device illustrated in FIG. 1 in the area of an electromagnetic valve 1. The said pressure control valve 1 concerns an electromagnetic valve closed in its basic position and having a magnetic drive that is essentially comprised of the valve coil 9 mounted on the sleeve-shaped valve housing 14, the magnetic core 10 closing the valve housing 9, and the magnetic armature 11 that is movably arranged in the valve housing 14 and, in the direction of the valve seat 12 in the valve housing 14, carries a spherical valve closure member 13. The pressure control valve 1 extends into the pressure-fluid-conducting channels 4 within the valve carrier 2 that lead, as the case of application may be, to a braking pressure generator and/or the wheel brakes of a motor vehicle braking system.

A special feature of the present invention in this respect is the provision of a pressure fluid channel 15 that penetrates the magnetic core 10 and extends up to the pressure sensor 3 interposed between the pressure control valve 1 and the electric module 5. The pressure sensor 3 is positioned in space 17 of the pressure control device by means of a special sensor carrier 16. Electric contacts 18 connected to the pressure sensor 3 lead out of the sensor carrier 16 to the electric module 5 (control and regulating electronics) that is only represented in FIG. 2.

Another special feature of the pressure control device can be seen in the chosen way of sensing the pressure prevailing in the pressure fluid channel 15. To this end, a pressure meter tube 19 extends into the magnetic core 10 and, by way of the longitudinal groove 20 indented into the magnetic armature 11, is hydraulically connected to the hydraulic pressure at the valve closure member 13.

To be able to overcome manufacturing tolerances in the assembly of the sensor in the best possible way, either the pressure meter tube 19, the pressure sensor 3, or the sensor carrier 16 is arranged in a tolerance-compensating fashion. This may be achieved, for example, by a yieldingly supported and/or a yieldingly deformable pressure meter tube 19, to what end a deformable sealing element 21 is inserted into the magnetic core 10 according to FIG. 2. To facilitate the assembly of the pressure meter tube 19, the magnetic core 10 includes a gate opening 22 in the direction of the pressure fluid channel 15. The end of the pressure meter tube 19 that extends into the sensor carrier 16 can be received elastically with the pressure sensor 3 in the sensor carrier 16 when required. To take up the hydraulic pressure force that acts upon the pressure sensor 3, the sensor carrier 16 has a housing supporting structure as stiff as possible that is attached to the valve carrier 2 in the present embodiment to take up the reaction force. To dampen possible pressure pulsations in the direction of the pressure sensor 3, a throttle 23 is disposed in the magnetic core 10 and, in case of need, may also be positioned at any other location of the pressure sensing distance within the pressure control valve 1.

Figure 3:
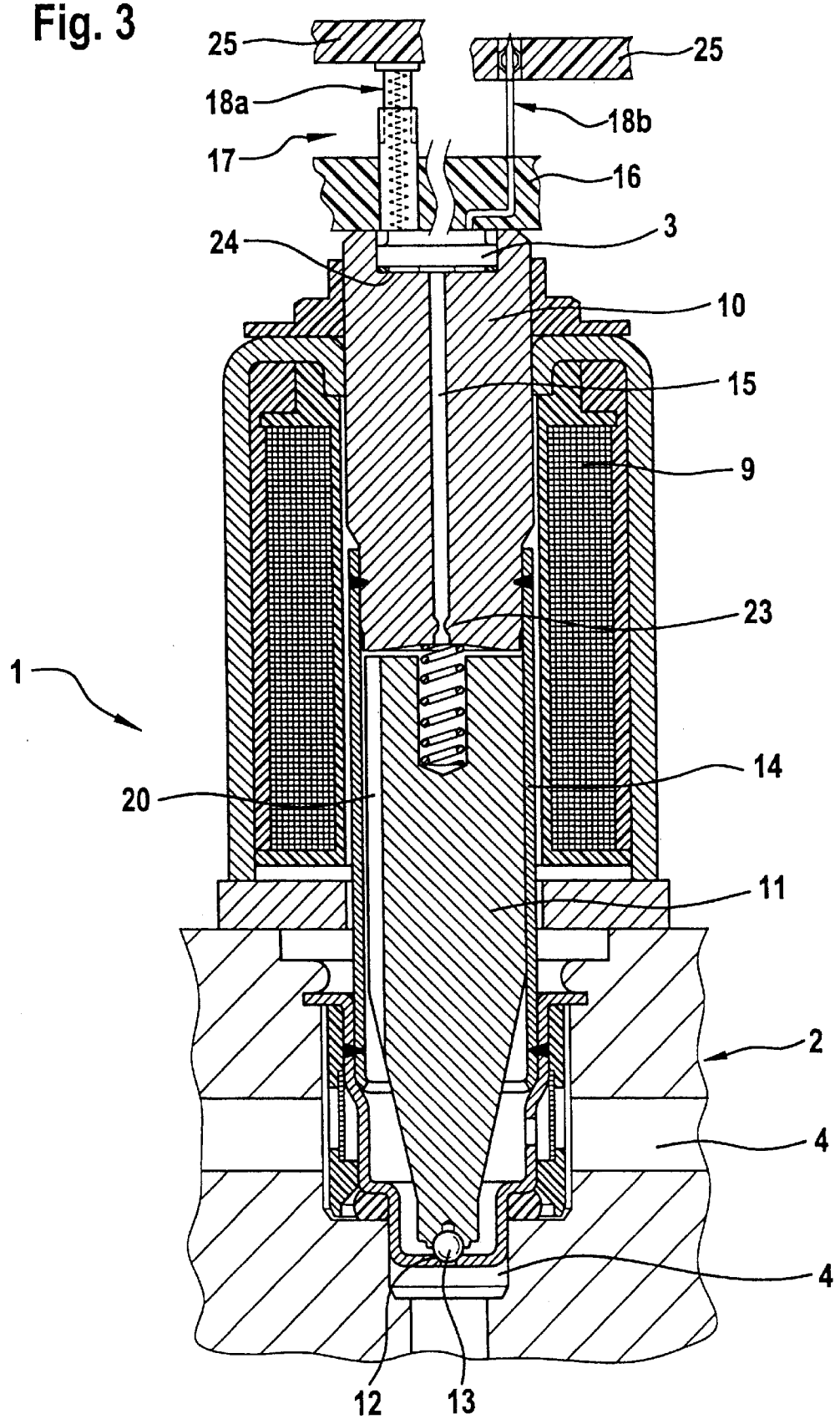
FIG. 3 is an electrical contacting and arrangement of a pressure sensor at an electromagnetic valve different in construction from FIG. 2.

Different from the embodiment of FIG. 2, FIG. 3 shows a pressure sensor 3 that is directly mounted into a recess 24 of the magnetic core 10 and is attached at the outside area of the magnetic core 10 in an operative engagement, positive engagement, or molecular bond, e.g., by means of laser welding. Depending on the type of attachment chosen, the pressure sensor 3 may also be supported in the magnetic core 10 by using elastomeric seals. The electric contacts 18 of the pressure sensors 3 that lead to the printed circuit board 25 of the electric module 5 are preferably designed as spring contacts 18a or press-in contacts 18b. However, this is not meant to preclude the use of soldered and welded contacting engagements. Besides, the electric contacts 18 may be protected against damage by using a sensor carrier 16 that is composed of a sealing gel, plastic or elastic sealing compound. Commercial plastics are also suitable as construction material for the sensor carrier 16.

In the following, FIG. 4 will present an overview over the further design of the leg-shaped sensor carrier 16 and also with respect to the other relevant components.

Figure 4:
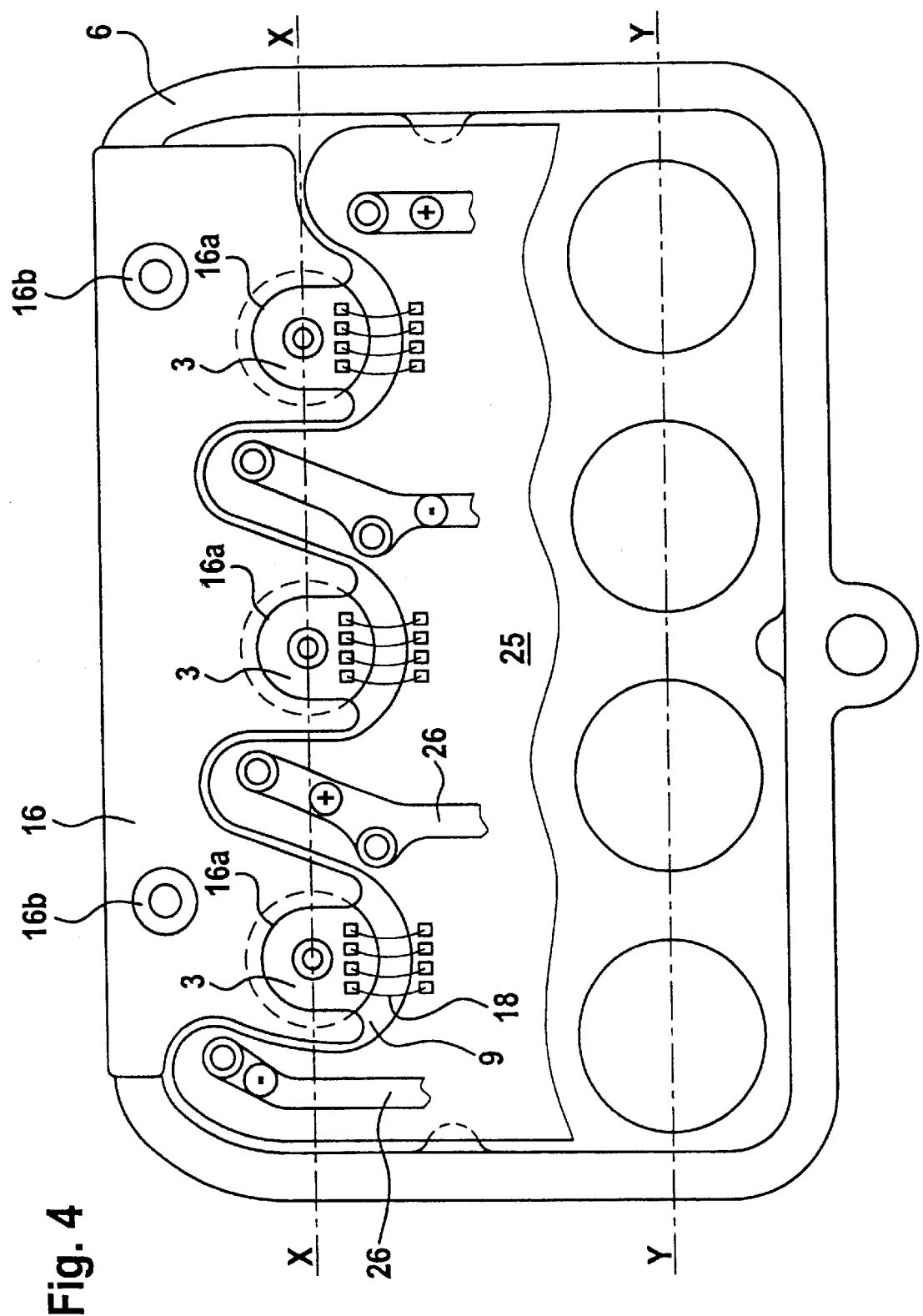
FIG. 4 is a top view of a block-shaped valve carrier, including a sensor carrier, several pressure sensors arranged on the pressure control valves, and a printed circuit board that is retained in a cover closing the valve carrier.

FIG. 4 shows a top view of a block-shaped valve carrier 2 that generally corresponds to the total design of a pressure control device indicated in FIG. 1. In FIG. 4, two valve rows X, Y are illustrated, and associated with valve row X is a sensor carrier 16 opened like a fork and having disc-shaped pressure sensors 3 inserted in its grooved tongs-shaped recesses 16a. Sensors 3 are connected to a substantially rectangular printed circuit board 25 by way of flexible electric contacts 18. The printed circuit board 25 is adapted in its contour to the fork-shaped sensor accommodation of the sensor carrier 16 and, thus, extends with its conductor tracks 26, directed towards the valve coils 9 of the pressure control valves 1, on either side of the receiving tongs (shown as clearance 16a) for the pressure sensors 3 into the fork-shaped sections of the sensor carrier 16. By means of two symbolically illustrated supporting points 16b, the sensor carrier 16 is either connected to the end surface of the valve carrier 2 (see in this respect the design of the sensor carrier 16 in FIG. 2) or, if required, to the cover 6 that receives the electric module 5 and the frame of which becomes apparent in FIG. 4. The arrangement of the pressure sensors 3 in the cover 6 simplifies in manufacture the performance test of all electric and electronic assemblies arranged in cover 6 in one single testing operation so that the valve carrier 2 with its hydraulic functional groups is not required during the electrotechnical test of the electric module 5 and the pressure sensor means. This permits a quality check or the hydraulic and the electronic assemblies irrespective of each other. The pressure sensors 3 are consequently a component of the electric module 5 and, after the performance test, are introduced through the short pressure meter tubes 19 (shaped like hollow needles) concentrically to the valve axles into the valve casings 8 of the pressure control valves 1, when the cover 6 is mounted onto the valve carrier 2.

Additionally, the invention disclosed renders it possible to arrange a sensor assembly between the hydraulic part (valve carrier 2) and the electronic part (electric module 5). The sensor assembly may be tested and mounted in conformity with the demands of automation as an independently operable and pre-testable subassembly for the pressure control device by the sensor carrier 16 designed as a busbar.

Figure 5:
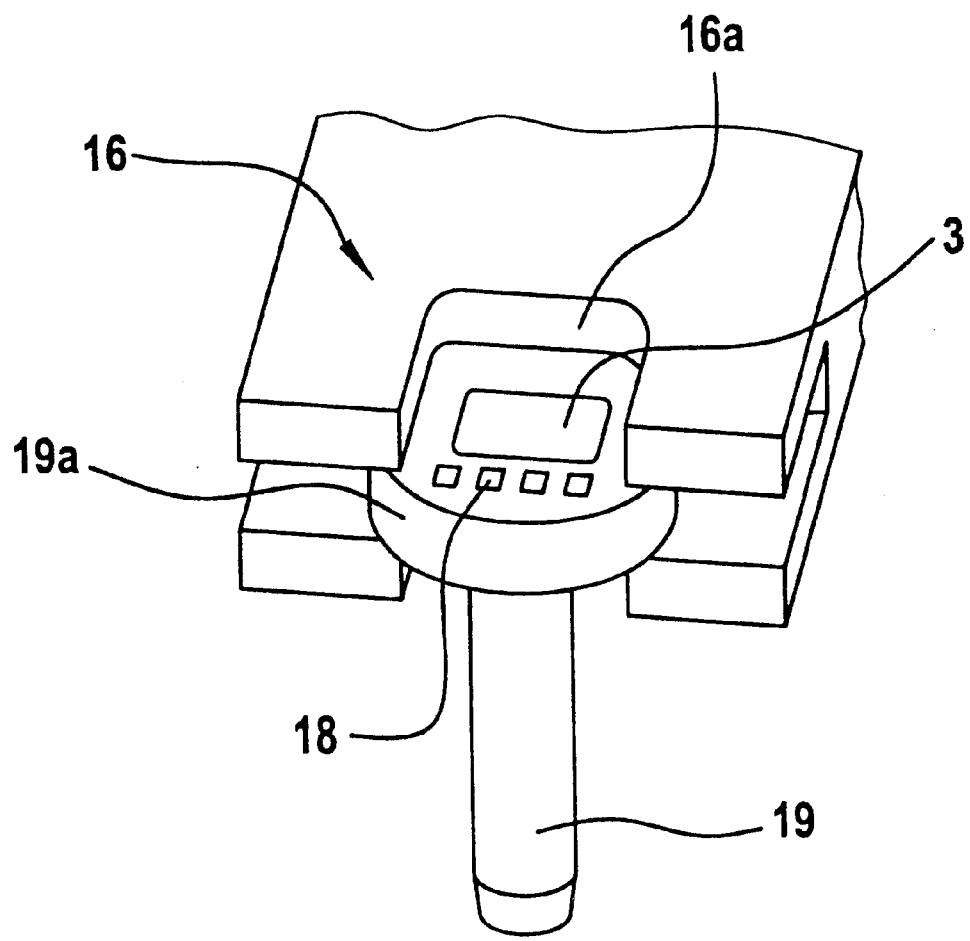
FIG. 5 is a perspective view of the pressure sensor retained in the sensor carrier.

The perspective view of the sensor carrier 16 explained above illustrates the adept tongs-type or clamp-type accommodation of the pressure sensor 3 within a disc-shaped accommodation head 19a of the pressure meter tube 19, being quasi embedded in the accommodation head 19a. This can be seen already in a side view of the components in FIG. 2. Thus, the pressure sensor 3 in the capacity of an assembly pre-assembled in the accommodation head is slipped into the tongs-type legs of the sensor carrier 16. The said can be extended to a retaining strip for a plurality of pressure sensors 3 corresponding to FIG. 4. Irrespective of the chosen accommodation and design of the pressure sensor 3, a simple mounting support of universal application is achieved for the pressure sensor means with this sensor carrier 16. The same applies to the universal design alternatives of the electric contacts 18 which are passed through the accommodation head 19a in FIG. 5.

In any case, the details of the present invention presented above permit achieving major advantages compared to the state of the art. Among others, these advantages are:

optimal positioning of the pressure sensors in a very small mounting space in overall size of the pressure control device economy of drilling operations in the valve carrier of material economy of testing and assembling auxiliaries economy of testing and assembling times clear subdivision into electronics and hydraulics assemblies no interference-prone contacting engagements reduction of air inclusions in the valve carrier optional extensions for the pressure sensor ports without the need to modify the valve carrier.

| List of Reference Numerals: | |
|---|---|
| 1 | pressure control valves |
| 2 | valve carrier |
| 3 | pressure sensor |
| 4 | pressure channel |
| 5 | electric module |
| 6 | cover |
| 7 | electric motor |
| 8 | pump |
| 9 | valve coil |
| 10 | magnetic core |
| 11 | magnetic armature |
| 12 | valve seat |
| 13 | valve closure member |
| 14 | valve housing |
| 15 | pressure fluid channel |
| 16 | sensor carrier |
| 16a | clearance |
| 17 | space |
| 18 | contact |
| 19 | pressure meter tube |
| 19a | accommodation head |
| 20 | longitudinal groove |
| 21 | sealing element |
| 22 | gate opening |
| 23 | throttle |
| 24 | recess |
| 25 | printed circuit board |
| 26 | conductor track |

What is claimed is:

1. Pressure control device, comprising:

at least one valve carrier accommodating a pressure control valve, a pressure sensor for detecting a hydraulic pressure in a pressure fluid channel of the valve carrier, an electric module including electric or electronic structural members, wherein said electric module is connected to the pressure control valve and the pressure sensor by way of electric contacts, wherein the pressure sensor is positioned, at least partially, in a space residing between the pressure control valve and the electric module and wherein at least one of the contacts connected to the pressure sensor leads from a sensor carrier to the electric module, wherein the sensor carrier is located at least partially within the space residing between the pressure control valve and the electric module.

2. Pressure control device as claimed in claim 1, wherein the electric module includes a printed circuit board which is enclosed by a fluid-tight cover or a sealing compound so that the printed circuit board along with the cover, or the sealing compound forms a pre-testable modular assembly which is electrically connected to the pressure sensor in the sensor carrier by means of a plug-in, press-fit or soldered contacting engagement.

3. Pressure control device as claimed in claim 1, wherein the pressure sensor is connected either directly to a pressure fluid channel of the pressure control valve or indirectly to the pressure fluid channel in the pressure control valve by way of a pressure meter tube projecting from the pressure control valve, wherein a channel leading through a magnetic core of the pressure control valve connects to a pressure channel in the valve carrier.

4. Pressure control device as claimed in claim 3, wherein the sensor carrier includes a stiff housing supporting structure which is connected to the valve carrier or to a cover closing the valve carrier to accommodate the reaction forces.

5. Pressure control device as claimed in claim 1, wherein the pressure sensor is arranged in a tolerance-compensating fashion, at least so as to be transversely movable relative to a longitudinal axis of the pressure control valve.

6. Pressure control device as claimed in claim 5, wherein the tolerance compensation is effected either by way of a yieldingly designed sensor carrier or by way of a yieldingly supported or deformable pressure meter tube.

7. Pressure control device as claimed in claim 1, wherein the sensor includes a sensor carrier made from a plastic or an elastic sealing compound.

8. Pressure control device as claimed in claim 1, wherein for damping pressure pulsations in the direction of the pressure sensor, a throttle is provided in the area of the pressure fluid channel.

9. Pressure control device as claimed in claim 1, wherein the pressure sensor is attached to a magnetic drive by means of operative engagement, form lock, or molecular bond.

10. Pressure control device as claimed in claim 1, wherein the pressure sensor is configured as a plug-in module which, at one end, includes a pressure meter tube that is inserted into a magnetic drive of the pressure control valve.

11. Pressure control device as claimed in claim 10, wherein said pressure sensor includes a sensor carrier which is either attached to a cover or to a valve carrier mountable on the cover.

* * * * *